United States Patent [19]

Ernsting

[11] Patent Number: 4,807,237
[45] Date of Patent: Feb. 21, 1989

[54] METHOD AND APPARATUS FOR OPERATING A DYE LASER WITH A PROTON TRANSFER REACTION

[75] Inventor: Nikolaus Ernsting, Göttingen, Fed. Rep. of Germany

[73] Assignee: Max-Planck -Gesellschaft zur Förderung der Wissenschaften e.V., Göttingen, Fed. Rep. of Germany

[21] Appl. No.: 888,128

[22] Filed: Jul. 18, 1986

[30] Foreign Application Priority Data

Jul. 18, 1985 [DE] Fed. Rep. of Germany ....... 3525689

[51] Int. Cl.⁴ .............................................. H01S 3/20
[52] U.S. Cl. ...................................... 372/53; 372/25; 372/89
[58] Field of Search ........................... 372/53, 25, 89; 330/4.3

[56] References Cited

PUBLICATIONS

Ernsting, et al; "Dye Laser . . . Proton Transfer"; Appl. Phys. B39, pp. 155–164; 1986.

Itoh, et al; "Transient Absorption . . . 7 Hydroxyflavone"; J. Am. Chem. Soc. 1984; 106; pp. 4320–4324.

Zs. Bor, S. Szatmari, Alexander Muller, "Picosecond Pulse Shortening by Travelling Wave Amplified Spontaneous Emission", 1983, Applied Physics B–32, pp. 101–104.

P. Chou, D. McMorrow, T. J. Aartsma, M. Kasha, "The Proton–Transfer Laser.Gain Spectrum and Amplification of Spontaneous Emission of 3–Hydroxyflavone", 1984, American Chemical Society, pp. 4596–4599.

Ahsan U. Khan, Michael Kasha, "Mechanism of Four-–Level Laser Action in Solution Excimer and Excited–State Proton–Transfer Cases", Mar. 1983, Proc. Natl. Acad. Sci. USA, pp. 1767–1770.

Jan-Erik A. Otterstedt, Photostability and Molecular Structure, J. Chem. Phys. vol. 58, #12, p. 5716 Jun. 15, 1973.

C. M. Orlando, Jr. et al. Red-and Near-Infrared-Luminescent Benzazole Derivatives, Chem. Comm. 1971, No. 1708 p. 1551.

H. J. Heller et al., Some Aspects of Stabilization of Polymers Against Light, Pure Appl. Chem. vol. 36 (1973) p. 141.

Walter Klöpffer, Intramolecular Proton Transfer in Electronically Excited Molecules, Adv. Photochem, vol. 10 (1977) p. 311.

Von A. Graness et al. Untersüchüngen züm Isotopenainflüss auf den Intramolekularen Protonentransfer . . . . Z. Phys. Chem. Leipzig vol. 261 (1980) #6p.1152.

Andrej Mordzinski et al., Intramolecular Proton Transfer in Excited Benzoxazoles, Chem. Phys. Letters, vol. 90 #2, p. 122 (Jul. 23, 82).

W. Sibbett et al., Passive Mode Locking in the Blue Spectral Region, Optics Communications, vol. 46 #1 p. 32 (Jun. 1, 1983).

D. Huppert et al., Laser Studies of Proton Transfer, Adv. Chem. Phys. vol. 47, pt. 2 (1981) p. 643.

*Primary Examiner*—James W. Davie
*Assistant Examiner*—Xuan T. Vo
*Attorney, Agent, or Firm*—Frishauf, Holtz, Goodman & Woodward

[57] ABSTRACT

In a laser oscillator or laser amplifier, a so-called switching dye is used which strongly reduces the degree of amplification for the laser radiation after a short time interval, by means of transient absorption. Molecules or molecule systems in which a proton transfer takes place in the excited state can serve as switching dyes. The radiation pulse exciting the switching dye must have a sufficiently steep leading flank to assure that the excited state of the tautomeric form is rapidly occupied. The immediately following occupation of the ground state of the tautomeric form by emission of radiation and radiationless transitions, and/or of triplet states of the tautomeric and normal form by radiationless transitions, builds up a transient absorption and inhibits the rise of an inversion sufficient for renewed radiation emission.

16 Claims, 5 Drawing Sheets

I    2-(2-Hydroxyphenyl)-Oxazol

II    2-(2-Hydroxyphenyl)-5-Phenyl-Oxazol (PPO-OH)

III    2-(2-Hydroxynaphth-1-yl)-5-Phenyl-Oxazol (α-NPO-OH)

IV    2-(3-Hydroxybiphen-4-yl)-5-(4-Biphenyl)-Oxazol (BBO-OH)

V    2,5-Bis(5-Phenyloxazol-2-yl)-Hydrochinon (POPOP-(OH)$_2$)

VI    2-(2-Hydroxyphenyl)-Benzoxazol (PBX-OH)

VII    2-(3-Hydroxybiphen-4-yl)-5-Phenyl-Benzoxazol (PBBO-OH)

VIII    2,5-Bis-(Benzoxazol-2-yl)-Phenol for X = H, -Hydrochinon for X=OH IX    6-(Benzoxazol)-2-yl)-7-Hydroxy-Cumarin

FIG. 2b.

X — 2-Phenyl-5-(Hydroxybiphen-4-yl)-1.3,4-Oxadiazol (PBD-OH)

XI — 2,5-Bis-(3-Hydroxybiphen-4-yl)-1.3,4-Oxadiazol (BBD-(OH)$_2$)

XII — 2-(4-tert.Butylphenyl)-5-(3-Hydroxybiphen-4-yl)-1.3,4-Oxadiazol (Butyl-PBD-OH)

XIII — 3-Hydroxyflavon

XIV — (2,2'-Bipyridyl)-3,3'-Diol

FIG. 3

I — 7-Hydroxyflavon in Methanol

II — 7-Hydroxychinolin in Methanol

METHOD AND APPARATUS FOR OPERATING A DYE LASER WITH A PROTON TRANSFER REACTION

This invention concerns dye lasers utilizing a chemical system capable of providing a proton transfer reaction in which a normal form of a compound in the ground state is put into an excited state of the normal form by means of a pumping radiation pulse. Then, by proton transfer with a very short first time constant, the normal form spontaneously changes into an excited state of a the tautomeric form of the compound, which then can go into a ground state of the tautomeric form, a higher energy level form than the ground state of the normal form, and/or into the lowest triplet state of the tautomeric form. The transition to the ground state of the tautomeric form may proceed without radiation, or via spontaneous emission of fluorescence, or via stimulated emission of laser radiation. In the absence of stimulated emission, the decay of the excited state of the tautomeric form is characterized by a second time constant. The ground state of the tautomeric form goes into the normal form ground state with a third time constant.

Lasers in which a proton transfer reaction is utilized to generate a "population inversion", required for laser emission, are known, e.g., form the publications Proc. Natl. Acd. Sci. USA, Vol. 80, pp. 1767–1770, March 1983, Chemistry and also J. Phys. Chem. 1984, Vol. 88, pp. 4596–4599. This is a matter of dye lasers in the broadest sense. The proton transfer reaction can take place between a solvent and a dissolved dye (intermolecular proton transfer) or in the dye itself (intramolecular proton transfer). The concept "dye" is understood here, as is common in laser physics, independently of absorption properties of the material in question within the visible light spectrum.

SUMMARY OF THE INVENTION

It is an object of the present invention to provide a method and apparatus for operating a dye laser working by a proton transfer reaction with which short dye laser pulses can be produced, the duration of which is substantially shorter than the exciting pumping radiation pulse and is essentially independent of the duration of the pumping radiation pulse.

Briefly, the intensity of the pumping radiation pulse is raised to a value sufficient for the emission of a brief laser radiation pulse with a rise time which is shorter than twice the above-mentioned second time constant of the excited state of the tautomeric form of the dye and then, during the rest of the pumping radiation pulse, remains below a relative rise rate of 10% per second time constant.

The above-mentioned value to which the intensity of the pumping radiation pulse rises within the rise time mentioned, may be a first maximum value of the pumping radiation intensity, from which, if there is a further rise during the rest of the pumping radiation pulse, that further rise is by less than 50% further. In one aspect of the invention, the chemical system is used both as the laser dye and also as the switching dye for time limiting of the laser radiation. In another aspect of the invention, the chemical system for proton transfer operates additionally to a laser dye emitting the laser radiation.

As for the materials of the chemical system, in a first aspect of the invention (intramolecular proton transfer) the chemical system may comprise one of the following compounds:
2-(2-hydroxyphenyl)-oxazole;
2-(2-hydroxyphenyl)-5-phenyl-oxazole;
2-(2-hydroxynaphth-1-yl)-5-phenyl-oxazole;
2-(3-hydroxybiphen-4-yl)-5-(4-biphenyl)-oxazole;
2,5-bis-(5-phenyloxazol-2-yl)-hydrochinone;
2-(2-hydroxyphenyl)-benzoxazole;
2-(3-hydroxybiphen-4-yl)-5-phenyl-benzoxazole;
2,5-bis-(benzoxazol-2-yl)-phenol;
2,5-bis-(benzoxazol-2-yl)-hydrochinone;
6-(benzoxazol-2-yl)-7-hydroxy-coumarin;
2-phenyl-5-(3-hydroxybiphen-4-yl)-1.3,4-oxadiazole;
2,5-bis-(3-hydroxybiphen-4-yl)-1.3,4-oxadiazole;
2-(4-tert.butylphenyl)-5-(3-hydroxy-biphen-4-yl)-1.3,4-oxadiazole;
3-hydroxyflavone;
(2,2'-bipyridyl)-3,3'-diol.

In another aspect (intermolecular proton transfer), the chemical system may be constituted by 7-hydroxyflavone or 7-hydroxychinone.

From the apparatus point of view, the invention is practiced with an optical resonator, a cuvette positioned in the resonator, a chemical system in the cuvette that is capable of providing a proton transfer reaction and of working as an active laser medium, and a pumping radiation source which delivers a pumping radiation pulse for generating a population inversion in the laser medium and, in particular, in accordance with the invention, the optical resonator has a small resonator decay time suited for the emission of a laser radiation pulse of a duration of less than 200 picoseconds and the pumping radiation source is so constituted that the pumping radiation pulse delivered by it has a rise time that is shorter than twice the above-mentioned second time constant of the excited state of the tautometric form of the chemical system and its amplitude after the emission of a brief radiation pulse remains under a relative rise rate of 10% per second time constant. Further details and advantageous embodiments of the apparatus and dispositions of the processes for carrying out the invention are described in detail after a statement of the advantages of the invention.

The present invention is based on the recognition that systems in which a proton transfer reaction can take place can be used not only as laser dyes, but also as "switching dyes." By a "switching dye" is here meant a chemical system of the above-identified kind which is able to suppress a laser emission completely after a short time, i.e., to "switch it off". The switching dye, as further explained below, can be used simultaneously as a laser dye or can be used as an addition to a laser dye. In the second case, the function of the switching dye is to put a time limit to the amplification of the active medium during the optical pumping of the actual laser dye.

In a surprisingly simple way, a single short dye-laser pulse can be produced without the necessity of setting special requirements upon the total duration of the pumping radiation pulse. By a "short dye laser-pulse" should be understood here a laser radiation pulse generated by an optically pumped dye laser containing a dye in solution or as vapor, which pulse has a duration of less than 200 ps.

The present process is distinguished by its surprising simplicity from the known processes for producing short dye laser pulses. Heretofore, there were required either expensive technical apparatus such as Kerr cells, Pockels cells, accoustical-optical deflection devices, rotating prisms or mirrors, or the like. No expensive pump lasers are required for the present invention, unlike in the case of so-called synchronous pumping. The laser resonator, likewise, does not need to be specially equipped as is the case with generation of short laser radiation pulses where relaxation oscillations are generated in a first resonator of lesser quality and the inversion is then held below the laser threshold of the first resonator by a laser oscillation in a second resonator of higher quality and longer resonator life.

BRIEF DESCRIPTION OF THE DRAWINGS

The invention is further described by way of illustrative example 3 with reference to the annexed drawings, in which.

DESCRIPTION OF THE ILLUSTRATED EMBODIMENTS

An essential characteristic of the present invention is that the amplification in the active medium of the laser falls a certain time after the initiation of the pumping pulse, this drop in amplification being produced by a dye that is to be designated as a switching dye. As already mentioned, the switching dye can at the same time be used as a laser dye or, alternatively, it can be used exclusively as a switching dye, in which case the laser emission is produced by a dye provided just for that purpose. In both cases, the generation of a dye-laser pulse which is short compared to the pumping pulse can be explained by time limiting of the amplification in the active medium.

Figure 2A:
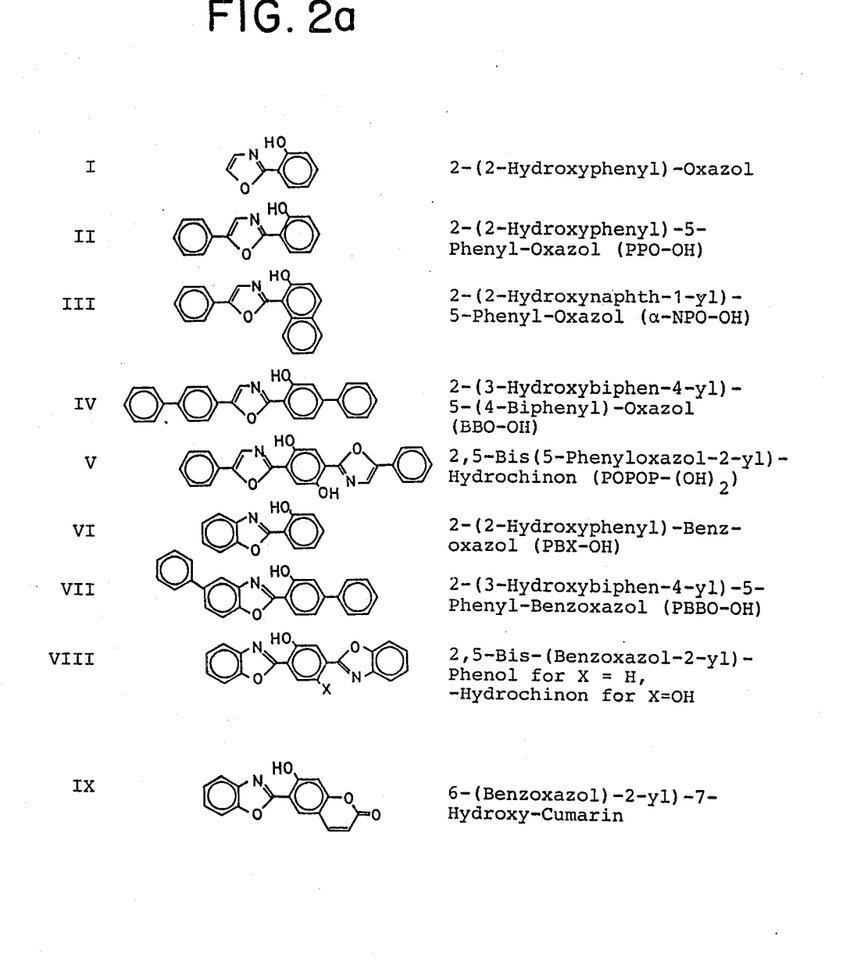
FIG. 2a and FIG. 2b shows structural formulae of various monomolecular dye systems which are usable in the process of the present invention.
Figure 2B:
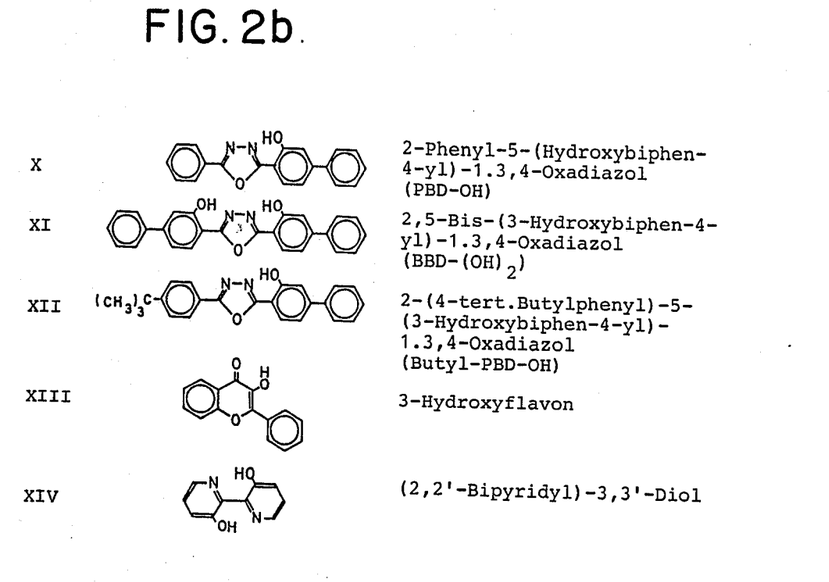
Figure 3:
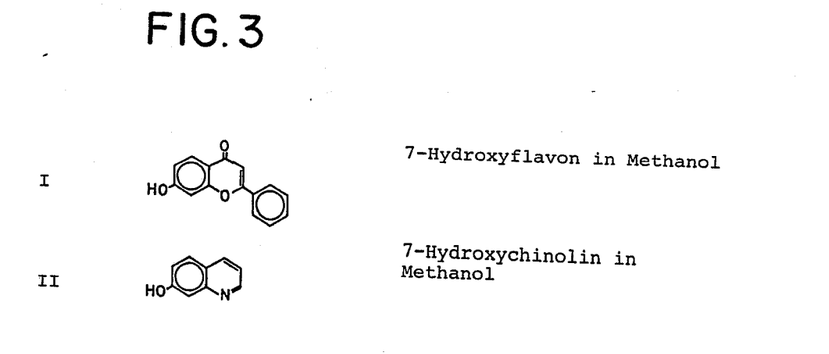
FIG. 3 shows structural formulae of two dyes usable in combination with a solvent as a dye system in accordance with the invention.

Within the scope of the invention, organic compounds can be used as laser and switching dyes which have an electronically conjugated pi-electron system which has an integrated hetero-atom with a single n-electron pair and which in addition, is substituted by a hydroxyl group. In this respect, a distinction should be made whether the hydroxyl group or its function is or is not disposed in a favorable stereo-chemical configuration with respect to the hetero-atom. Examples for both of these subdivision classes are illustrated in FIGS. 2 and 3.

It is common to the compounds of both classes that the arrangement of bonds and the charge concentration are drastically changed as the result of their optical exicitation into the first excited electronic state. Thereafter, a proton transfer reaction takes place in the electronically excited state. When the hydroxyl group is favorably oriented with respect to the hetero-atom (first class), this proton transfer is an intramolecular transfer of the hydroxyl proton over to the hetero-atom. In the other case (second class), the laser switching dye system consists of a prototropic solvent and a dye dissolved therein. In this case, in the course of the proton transfer reaction, there is a giving up of the hydroxyl proton of the dissolved dye to a solvent molecule and, in addtion, another proton may be transferred from a solvent molecule to the hetero-atom of the dye. Many proton transfer reactions of this kind have already been investigated; an excellent survey of these investigations is given in the publications of W. Klöpfer, Adv. Photochem. 10, p. 311–358 (1977) and Huppert et al, Adv. Chem. Phys. 47, Pt 2, p. 643–679 (1981).

Almost all investigations have shown that the actual proton transfer occurs very quickly in the excited state, in general at rates higher than $10^{11} s^{-1}$, if the reaction partners already have a favorable orientation to each other in the ground state. For compounds with intramolecular proton transfer, this condition is always fulfilled in aprotic solvents and in the vapor state, while it is fulfilled for the other compounds in prototropic solvents, such as methanol, ethanol, etc.

In what follows the invention will be explained with reference to an example of compounds in which there is an intramolecular transfer of one or more protons in the excited state. On the basis of this explanation, it should however be clear without further illustration to workers in the field how these teachings are to be applied to dye systems in which proton transfer reactions with a solvent take place in the excited state.

Figure 1:
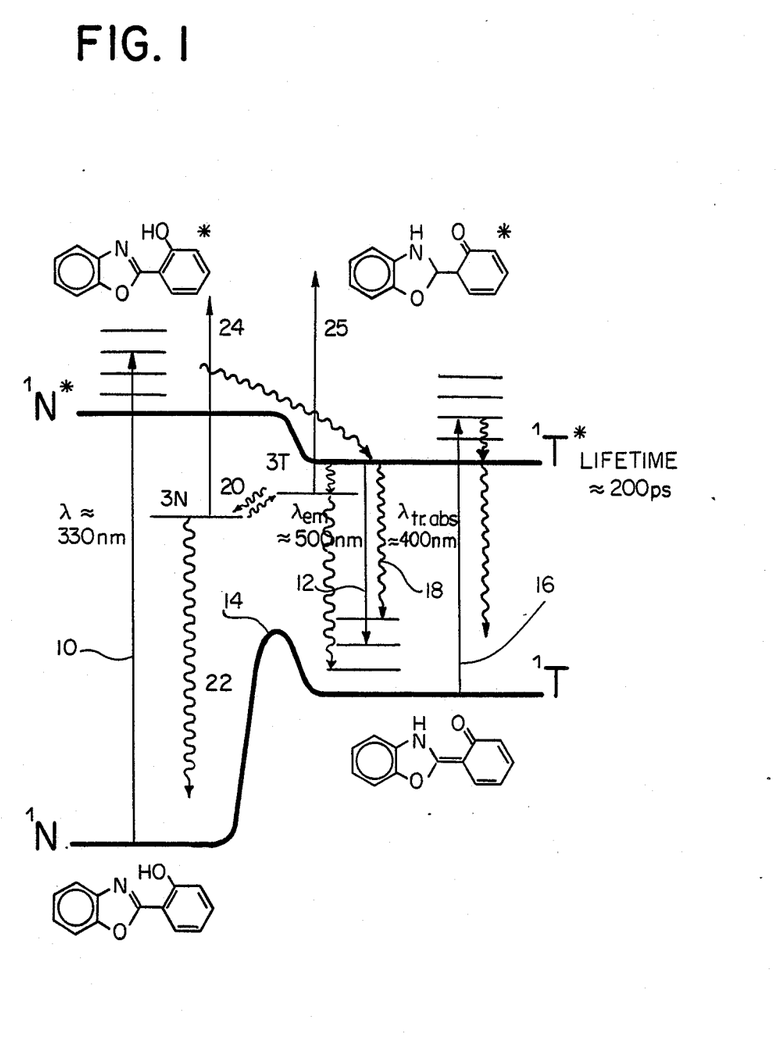
FIG. 1 is a graphical representation of the energy states of a typical laser switching dye, for explaining the principle of the process of the invention.

The manner of operation of the laser-switching dye according to the invention, is most simply explained by a description of the energy dissipation processes that follow optical excitation. This represents without limitation what happens in the typical example of 2-(2hydroxylhenyl)-benzoxazole, of which FIG. 1 shows the energy states and structural formulae for the various states.

At the beginning, the molecule is present in its stable, normal ground state form $^1N$. The molecule is made to pass over into an excited state $^1N^*$ by optical excitation with radiation of a wavelength of about 330 nm, as shown by the long upwardly directed arrow 10. Light emission is improbable in this state. Much more likely, within a few picoseconds, is the shift of the proton of the OH group in the molecule to produce an excited tautomeric molecule in its excited state $^1T^*$. Because of the lower energy level of $^1T^*$, energy is released in the form of heat. The energy of the corresponding ground state $^1T$ of the tautomeric form of the molecule is greater than that of the ground state $^1N$ of the normal form by about 63 kJ. In consequence, the wavelength of the fluorescence radiation from the tautomeric state $^1T^*$, shown by a downwardly directed arrow 12, is substantially longer, e.g., about 500 nm, than the wavelengh of the radiation which would be expected for fluorescence of the primarily excited state $^1N^*$ of the normal form of the molecule. Furthermore, the radiation-less conversion of the energy stored in $^1T^*$ into heat here substantially increases in importance. The probability of radiation-less transition from $^1T^*$ to $^1T$ related to the release of heat increases strongly, moreover, with temperature. The lifetime of the excited tautomeric molecule $^1T^*$ at room temperature is about 200 ps and for example, at a temperature 50° C. higher, it is only about 80 ps. The quantum yield for the tautomeric fluorescence according to the arrow 12, widely Stokes-shifted, is less than 2% at room temperature.

The tautomeric molecule therefore reaches its ground state $^1T$ by giving up its energy in the form of fluorescence or laser radiation 12 or in the form of heat. In some cases, this state is unstable and the proton then falls with a very short time constant back into its original location corresponding to the ground state $^1N$ of the normal form. Compounds with this property have great commercial importance as UV stabilizers, but they are not suitable for the purposes of the invention. In compounds which are capable of a proton transfer in the excited state, the ground state $^1T$ of the tautomeric form may be separated, however, from the ground state $^1N$ of the normal form by an energy barrier or threshold 14 which inhibits the transmission $^1T$ to $^1N$. The state $^1T$ is then metastable. The metastable state $^1T$ now has a long-wavelength intensive absorption band which corresponds to the excitation of $^1T$ to $^1T^*$ represented by an arrow 16 in FIG. 1. It should be observable as transient absorption of the excited laser-switching dye.

The decay of the excited state $^1T^*$ of the tautomeric form, with the above-mentioned second time constant, may also follow another route. At first, relatively fast intersystem crossing 19 can lead to the lowest triplet state $^3T$ of the tautomeric form. This latter state may transfer the proton back to its original site and thus produce the triplet state $^3N$ of the normal form. In general, $^3T$ and $^3N$ will most likely be in a thermodynamic equilibrium 20. Both $^3T$ and $^3N$ triplet states will decay relatively slowly to their respective singlet ground state. The triplet states are metastable, and they should also be observed as transient absorption of the laser-switching dye.

In the example of 2-(2-hydroxyphenyl)-benzoxazole, the characteristic rise time of the transient absorption, thus the "filling up duration" of the ground state $^1T$ of the tautomeric form and/or the triplet states $^3T$ and $^3N$, is about 200 ps. The spectral absorption maximum lies at about 400 nm. In general, however, the absorption of light of a wavelength which corresponds to the transient absorption does not lead to a transition $^1T^*$ to $^1N^*$ with a corresponding back proton transfer, but instead the irradiated volume is predominantly heated up, which, as alreadly mentioned, leads to a shortening of the lifetime of the excited state $^1T^*$.

In what follows an explanation is given how systems of the above-described kind can operate as laser-switching dyes for producing short laser pulses. Here again, reference to FIG. 1 may be made and it may be assumed that the dye is provided as a laser-active medium in the optical resonator of a dye laser. The resonator decay time should be chosen to be so small that the relaxation oscillation pulses of the desired short duration can be produced.

By optical pumping with a radiation that usefully (but not necessarily) corresponds to the longest wavelength absorption band related to the transition 10 from $^1N$ to $^1N^*$, the tautomeric excited state $^1T^*$ becomes occupied at a rate which depends practically exclusively on the course of the pumping radiation intensity on account of the short time constant of the transition from $^1N^*$ to $^1T^*$. The corresponding electronic ground state $^1T$ of the tautomeric form at first remains fully unoccupied because of its high energy and its metastable character and the inversion $T^*/T$ is correspondingly high. For this reason, the amplification is also very great (in spite of the small $^1T^*$ fluorescence quantum yield). With sufficiently small resonator decay time, the inverted medium accordingly delivers a short relaxation laser oscillation pulse corresponding to the transition 12 and the ground state $^1T$ of the tautomeric form is thereby populated.

In order that the system may suppress a further emission of laser radiation and operate as a switching dye, the time course of the intensity of the pumping radiation 10 must satisfy certain requirements according to the invention: the pumping radiation intensity should reach a value so high at the time of the emission of the first laser radiation pulse, which is the sole laser pulse for the particular pumping radiation pulse, that the laser emission 12 can take place with generation of a substantial population of the metastable states and, for the remainder of the pumping radiation pulse, the relative increase of the pumping intensity should lie below 10% during a time interval, the duration of which corresponds to the characteristic fill-up time of the tautomeric ground state and/or the triplet states, so that on the one hand the population of the excited state $^1T^*$ of the tautomeric form should not rise so high that the inversion is sufficient for a further laser radiation emission from the excited tautomeric state $^1T^*$ and, on the other hand, the population of the ground state $^1T$ of the tautomeric form and/or of the triplet states $^3T$ and $^3N$ is caused to remain sufficient for the transient absorption.

In particular, these conditions can be fulfilled by having the pumping radiation pass through its intensity maximum at the instant of the generation of the laser radiation pulse.

In practice, there can be used for the pumping radiation source, corresponding dye lasers, pulsed excimer lasers or nitrogen lasers or the like, the radiation pulses of which should have a sufficiently short rise time.

When the above specified conditions are fulfilled, the pumping radiation is no longer sufficient during the remaining part of the pumping radiation pulse to build up the necessary inversion for laser emission for the following reasons: In the first place, the application of the pump pulse accumulates an occupation of the metastable absorbing states which shows practically no decline during the remaining part of the pumping pulse. In order now to reach the same degree of inversion as was present during the laser emission of the first radiation pulse, it is therefore necessary to have a population of the upper laser level $^1T^*$ that is greater than the population sufficient for the emission of the first radiation pulse. The supplementary population of $^1T^*$ to be provided depends on how much the already achieved population of $^1T$, and/or of the triplet states $^3T$ and $^3N$, reduces the laser emission of $^1T^*$. Experimental investigation of the compounds designated I, II, VI and VIII in FIG. 2a have shown, for example, that with the intensity of the pumping light remaining constant, further laser pulses are not generated. Thus, in order to maintain the increased population of the excited upper laser level, a supplementary pumping time is necessary which is prolonged in comparison with the already expended pumping time. The storage time of the state $^1T^*$ is limited, however, by its actually relatively short lifetime of typically less than 200 ps, so that with pumping radiation intensity that remains the same or at least does not rise too strongly, there is obtained an at least approximately stationary difference between the $^1T^*$ and $^1T$ populations, which surely fails to correspond to the inversion necessary for laser emission. In consequence, further laser pulses cannot be generated.

In the second place, after the first short laser pulse, heat is released through the radiationless deactivation of $^1T^*$ (indicated by the wavy line 18) which is continuously filled up through $^1N^*$. The resulting temperature rise of the laser medium has, as already mentioned, the effect of shortening the lifetime of the excited tautomeric state $^1T^*$ and accordingly, with this effect, a reduction of the inversion of the participating laser level that can be reached.

In the third place, bleaching of the absorption of the solution can be obtained under favorable conditions at higher pump intensities such as are provided for example in the case of longitudinal pumping. This accordingly has the natural result that the pumping from $^1N$ through $^1N^*$ to $^1T^*$ stops and no further inversion can be produced.

In the example described above, the laser-switching dye system worked both as a laser dye emitting laser radiation and also as a switching dye for shortening the laser pulse duration. In what follows the function of the laser switching dye as a purely switching dye is described. Here, the proton transfer systems operate only for switching and not as laser dyes. There is taken here as a concrete example the case where it is desired to produce single, short laser dye pulses of a wavelength of about 390 nm. For this purpose, we take for an example 2-(4-biphenyl)-6-phenylbenzoxazole, designated for short as PBBO, dissolved in the nonpolar aprotic solvent cyclohexane. The laser resonator used must, of course, have a sufficiently short resonator decay time corresponding to the duration of the pulse to be produced. Furthermore, it is necessary to proceed on the basis that the pumping laser used must have an emission wavelength of about 340 nm, as for example a paraterphenyl dye laser, and that the rise time of the pumping radiation pulse up to the time when it reaches a first intensity maximum is less than 200 ps. Under these assumptions, a laser switching dye is needed that is effective in the solvent used, absorbs in its normal form a radiation of a wavelength of 340 nm and, finally, at a wavelength of 390 nm, has only the transient absorption of the tautomeric form and/or of the triplet states. Such a dye is 2-(2-hydroxyphenyl)-benzoxazole which has already been used above as example, for which the characteristic rise time of the tautomeric transient absorption is 200 ps.

A solution of this switching dye is now produced in the cyclohexane solvent also used for the laser medium, in which case it is desirable for the optical density of the switching dye solution to be about equal to that of the laser dye solution at the pumping wavelength. This switching dye solution is now added to the laser dye solution serving as the laser medium in the dye laser, in such quantity that only a single relaxation oscillation of the pumped laser medium can take place. This limitation of the laser emission is based on the general principle that the amplification of the active laser medium is to be reduced by the transient absorption of the switching dye during the course of the pumping pulse.

The transient absorption (arrow 16 in FIG. 1) must, of course, lie in the region of the laser radiation wavelength for this purpose, which is assumed in all the following examples without it being mentioned in each individual case. This process for generating, and as further explained below, also for amplifying short laser pulses is unexpected and even surprising in its conceptual and practical simplicity. With increasing concentration of the switching dye, the following characteristics of the process of the invention can be utilized:

In the first place, the suppression of all the relaxation oscillations of the pumped laser medium following the first relaxation oscillation is independent of the intensity fluctuations from pulse to pulse of the pumping laser that is used, since, for example, a higher pumping intensity also leads to a correspondingly higher transient absorption and thereby a lower amplification.

In the second place, it is possible, by use of a sufficiently high concentration of the switching dye, to assuredly suppress also that laser emission which otherwise would be caused by a further interval of rise of the intensity of the pumping light after the first maximum of the pumping light intensity is reached. There remains accordingly, of the heretofore stated requirements regarding the time course of intensity of the pumping light, merely that the pumping radiation must have a sufficiently rapid rise time.

Finally, calculations have shown that the photochemically produced metastable states $^1T$, $^3T$, or $^3N$ of the switching dye can operate in two ways. The first manner of operation consists in the transient absorption of laser light already mentioned. With increasing concentration with time of the generated state, the latter can also take over energy stored in the upper level of the actual laser dye by a radiationless path. This so-called Förster energy transfer effectively represents a shortening of the lifetime of the upper laser level, so that this level in the course of time can be pumped only less effectively and the amplification accordingly declines.

Amplification of Brief Radiation Pulses by Means of a Laser-Switching Dye.

The amplification of short laser pulses is a task that very often arises in laser technology. Ultrashort laser pulses in the picosecond range can be produced by the method of synchronous pumping, for example. These ultrashort laser pulses must, however, be further amplified for use photochemistry or in nonlinear optics. For the amplifying stage, short coherent light flashes are used as pumping light pulses, such as can be obtained at some expense, for example, with a mode-coupled and frequency multiplied Nd: YAG laser, or else UV gas lasers are used which, however, deliver laser pulses of a duration of several nanoseconds.

Independently of the way in which the active medium of the amplifier stages are pumped, there are a series of practical problems resulting from the long storage time of the commonly used active medium. In these cases, what is almost always involved is a solution of a good laser dye, i.e., a dye which in general possesses a high fluorescence quantum yield. The actual lifetime of its electronically excited state is therefore determined largely by its radiation lifetime. A typical lifetime and, correspondingly, storage time of the amplifier stage is 5 ns. The amplifier becomes active immediately after the beginning of optical pumping and remains active until a few nanoseconds after the interruption of pumping. During this time, the amplifier operates especially effectively for small incident light signals. These light signals can, for example, be reflections of the actual fluorescence light emitted along the optical axis. With the assumed active time of at least five ns, all optical elements in the radiation path can interfere by reflection if they have the spacing of less than 75 cm from the amplifier. So-called saturable absorber dyes are provided in separate cuvettes for optical isolation of the amplifier stage. Such saturable absorbers are, however, not known for the particularly interesting spectral range of the near ultraviolet (300 to 400 nm). At present, the shortest wavelength for which a saturable absorber is available is 452 nm. The practical use of a saturable absorber, moreover, requires optical elements such as lenses and a cuvette, which introduce supplementary reflection losses. Finally, this procedure also leads to a prolongation of the optical radiation path, which can be of considerable disadvantage in a few applications.

When the invention is applied to the amplification of individual short or ultrashort laser pulses, the above-defined laser-switching dyes are now utilized to reduce the natural lifetime of the actively excited dye molecules in the amplifier and/or to limit the amplification in time. In what follows this principle is illustrated first for the case in which the laser-switching dye is also used in the amplifier as a laser dye and then for the case in which the laser-switching dye operates only as a switching dye in the amplifier or in some disposition part from the amplifier.

If the amplifier is to be operated with a laser-switching dye as the active laser dye, two possibilities come into consideration. As a first case, it can be assumed that the pumping light source delivers laser pulses, the duration of which is shorter than the natural lifetime of the upper laser level $^1T^*$ (FIG. 1). This lifetime then determines the storage time of the amplifier. In comparison with other laser dyes, this lifetime is very short, typically less than 200 ps.

The second possibility is the case in which the radiation of the pumping light source, after sufficiently rapid rise of intensity, still endures for a relatively long time, e.g., a few nanoseconds. Then the complete inversion of the occupation of the active tautomeric laser level $^1T^*/^1T$ is first reached. Because of the small natural lifetime of the upper laser level $^1T^*$, this inversion, as in the above case, dissipates rapidly and without radiation, however. Later, the inversion which gives net gain can then no longer be reached, as has been explained with reference to FIG. 1.

Finally, the inversion is reduced by stimulation from the short laser pulse to be amplified and the amplification is accordingly completely switched off.

If a laser-switching dye is used, which is different from the active laser dye, the amplification can be reduced practically to zero after a certain time interval by the transient absorption, as has been described above in the explanation of the purely switching dye function. The amplifier is then capable of functioning in practice, time and again, only within a time window, the width of which corresponds to the lifetime of the excited tautomeric laser-switching dye $^1T^*$.

Apparatus for Generating or Amplifying Short Laser Pulses with Use of a Laser-Switching Dye.

Because the concept of the manner of operation of laser-switching dyes for generating short laser pulses is so simple, there are necessarily a great number of concrete optical devices and apparatus which can operate according to the principle of the invention. In particular, many known processes and devices for generating short and ultrashort laser radiation pulses by the use of laser-switching dyes can be improved. By way of example only, there is mentioned here for this purpose, the process of exciting traveling waves (Appl. Phys. B32 101-104 (1983)).

Whereas in the known case, the pumping laser must deliver a short-duration coherent radiation pulse, when a switching dye is used as the active laser medium, evidently only the rapidly rising leading flank of the pumping wave front is still of significance. Thus the far-reaching expense that was heretofore necessary for generating intensive ultrashort pumping pulses for exciting traveling waves, becomes superfluous. The traveling wave laser can henceforth also be used for generating short laser pulses and not only for their conversion from one wavelength range to another.

Figure 4:
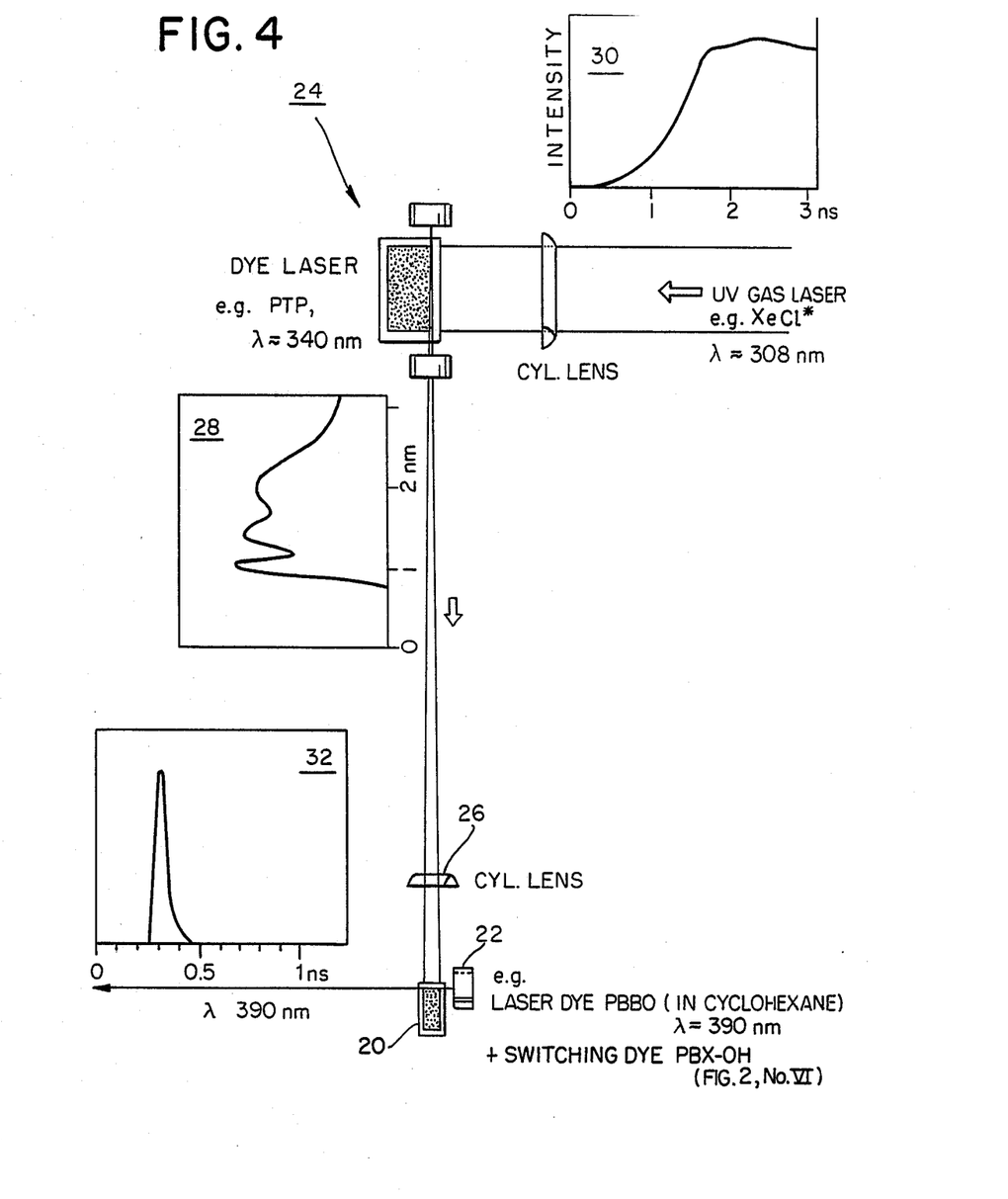
FIG. 4. schematically illustrates a laser apparatus for the practice of the invention, showing operating conditions by three graphs adjoining different parts of the apparatus.

A further simple apparatus is shown in FIG. 4. The actual dye laser which emits the desired short radiation pulses with a wavelength of about 390 nm, contains a cuvette 20 which, for example, contains PBBO in cyclohexane as laser dye and PBX-OH (FIG. 2, No. VI) as switching dye. The concentration of this laser dye was $4 \times 10^{-4}$ mol/liter and that of the switching dye $1 \times 10^{-3}$ mol/liter. The cuvette is positioned in an optical resonator which is defined on one side by a mirror 22 and, on the other side, by the wall of the cuvette 20 opposite the mirror.

The pumping radiation is generated by a dye laser 24 and is focused by a cylindrical lens 26 in the cuvette 20. The dye laser 24 can, for example, contain PTP as laser dye, which emits radiation at a wavelength of about 340 nm. The intensity profile of the pumping radiation pulse generated by the dye laser 24 is shown in the diagram 28 of the figure. The dye laser 24 is in its turn pumped by an ultraviolet gas laser not shown in the figure, e.g., a XeCl* laser. The pumping radiation pumping the dye laser 24 has a wavelength of 308 nm and the intensity course illustrated in the diagram 30 of the figure.

The dye laser operating with the switching dye emits a short radiation pulse of a wavelength of about 390 nm, of which the intensity profile of the pulse is illustrated in diagram 32 of the figure.

Figure 5:
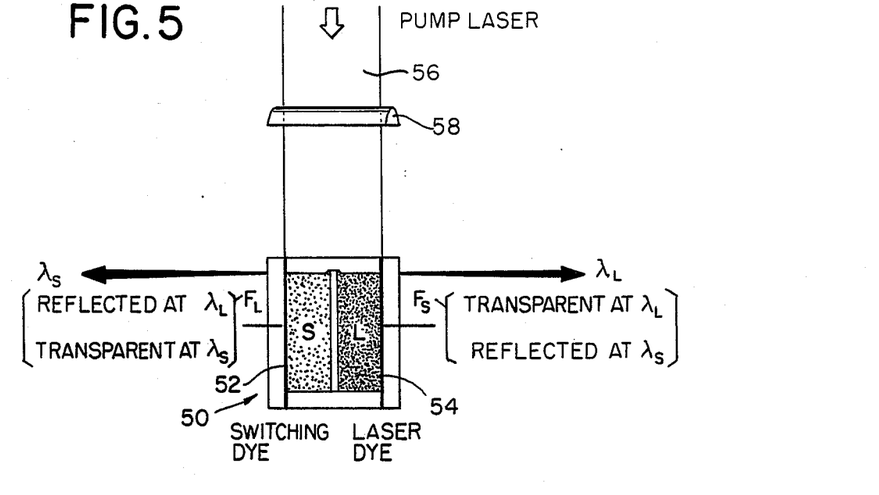
FIG. 5 shows a portion of a laser apparatus utilizing a laser dye and a switching dye in adjoining portions of the apparatus.

A further special apparatus that basically delivers very short laser pulses is illustrated in FIG. 5. The essential element consists of a double cuvette 50 having parallel outer windows 52 and 54 which constitute the laser resonator. The cuvette is subdivided by a partition into a cuvette chamber L, which contains the actual laser dye, and a cuvette chamber S which contains a cooperating laser-switching dye. The outer resonator windows 52 and 54 are mirrorized with multiple dielectric layers in such a way that the window 52 reflects well at the laser wavelength of the laser dye but is nevertheless partially transparent at the laser wavelength of the switching dye, while the window 54 reflects well at the laser wavelength of the laser-switching dye, but is nevertheless partially transparent at the wavelength of the laser dye. A rapidly rising pump radiation pulse 56 is focused from above through a cylindrical lens 58 into both of the chambers S and L of the cuvette 50. By suitable choice of the reflectivities of the mirroring provided on the windows 52 and 54, the result can be obtained that the inverted laser dye in L first oscillates in laser emission and very briefly thereafter the inverted switching dye in S goes into oscillation. A transient absorption then very quickly arises in the switching dye, however, which drastically reduces the resonating quality of the resonator for the actual laser with the active medium in L and inhibits further laser emission.

On the basis of the teaching set forth above, a person experienced in this field should be able to provide various types of apparatus without undue experimentation for the amplification of short laser pulses by means of laser-switching dyes. An example is illustrated in FIG. 6 in which the transient time switched absorption of the laser switching dye is separated from the active medium.

Figure 6:
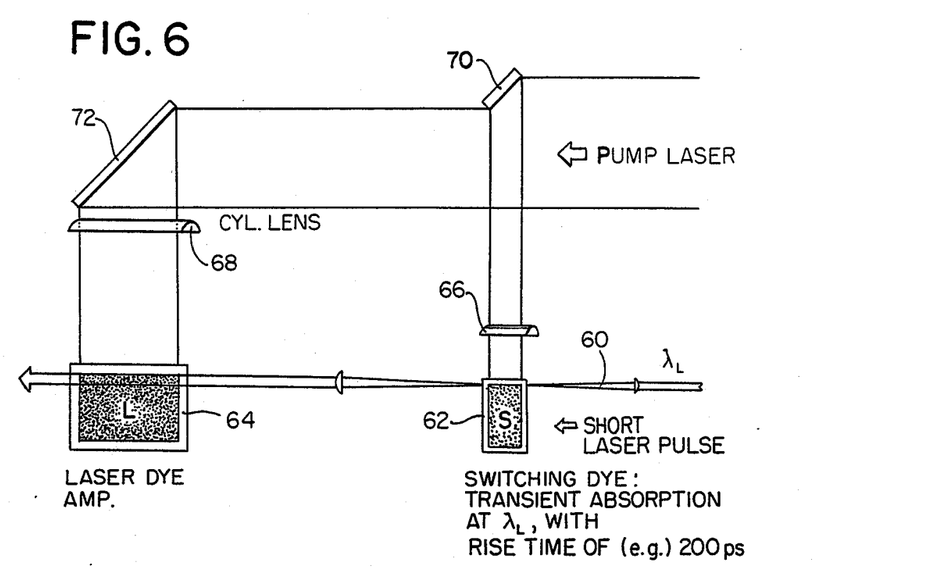
FIG. 6 shows a laser apparatus utilizing a laser dye and a switching dye in separate parts of the apparatus, in accordance with the invention.

In the apparatus according to FIG. 6, the short laser pulse to be amplified is focused by a lens in a first cuvette 62, which contains a switching dye, of which the transient absorption at the wavelength of the laser pulse 60 has a short rise time of e.g. 200 ps. After passing through the cuvette 62, the laser radiation pulse is focused by another lens in an amplifier cuvette 64 which contains a laser dye suitable for amplifying the laser pulse.

A pump radiation pulse is focused in the cuvette 62 and 64 by cylindrical lenses 66 and 68 and mirrors 70 and 72, as is evident from FIG. 6. The rapidly rising pumping radiation pulse has the effect that the switching dye begins transient absorption of the laser pulse 60 very shortly after its beginning, so that later stimulating laser pulses 60 either do not get to be amplified or reach the amplifier only heavily weakened.

Examples of Laser-Switching Dyes

Suitable laser-switching dyes contain a hydroxyl group on a conjugated pi electron system which contains mainly a basic heteroatom. For the latter there come into consideration especially carbonyl oxygen or azo nitrogen atoms. A further distinction can be drawn between systems which already in the ground state have a hydrogen bridge between the reaction centers and those in which the proton transfer in the excited state runs intramolecularly and such systems in which a prototropic solvent molecule is needed to take part in the reaction.

If desired, compounds of equivalent effect can also be used which contain, instead of hydroxyl groups, amino groups or thiol groups (—S—H).

Compounds with intramolecular hydrogen bridges are in general relatively stable photochemically. Compounds which contain an oxazole or oxadiazol grouping already play a special role as laser dyes. By substitution with hydroxyl groups in suitable positions, laser-switching dyes are obtainable of which the longest wavelength absorption bands are shifted towards longer wavelengths, as far as about 1000 $cm^{-1}$, compared to the starting compound. Excitation in these absorption bands leads to a tautomeric fluorescence with a Stokes-shift of about 10,000 $cm^{-1}$. This fluorescence can be utilized for the tautomeric laser process. It is particularly worth noting here that the magnitude of Stokes-shift of the tautomeric emission in connection with the photochemical stability and with the generally short natural lifetime of red emitting molecules can be utilized within the scope of the invention to produce especially short laser pulses in the near infrared spectrum. It has already been noted briefly in the literature (Chem. Comun. 1971, 1951) regarding the luminescence properties of compounds of this type, but not, however, regarding the possibility of utilizing them as switching dyes.

After excitation, a transient absorption then appears (arrows 16, 24, 25 in FIG. 1) which is used in the invention for laser-switching.

A few examples of compounds are given in FIGS. 2a, 2b and 3 which can be used within the scope of the invention as laser-switching dyes and indeed both as active laser dyes and also as purely switching dyes. In the first-mentioned function, it is possible with all the compounds there mentioned to generate in the simplest fashion short dye laser pulses with wavelengths greater than 490 nm and extending well into the near infrared. The second function of these compounds makes it possible, on the other hand, to switch laser pulses which are generated with other active dyes and to do so at wavelengths from 360 nm up to at least 500 nm. The dyes set forth in FIG. 2a and FIG. 2b therefore already are enough for generating and amplifying short laser pulses in a simple way in the entire spectral region from near ultraviolet to the near infrared.

Example compounds which enter into proton transfer reactions in the excited statea with a prototropic solvent and can be used as laser switching dyes are shown in FIG. 3.

For raising the solutibility of compounds of FIGS. 2a and 2b in non-polar solvents, methyl, tertiary butyl or similar groups can be substituted into the respective compounds. In that way, the properties of the compound so far as they are used in the scope of the invention, are not substantially altered. Other modifications also of the listed or similar dyes, which serve to change the spectral and dynamic properties of these dyes are likewise evidently possible within the scope of the present invention.

The characteristic time constant of the radiationless deactivation of $^1T^*$ should in general amount to at most 200 ps.

The pump radiation pulse should in general rise to the value necessary for emission of a short laser radiation pulse in less than 400 ps, preferably less than 300 ps.

For generating short laser radiation pulses, a so-called switching dye or dye-switching material can therefore be used in a laser oscillator or a laser amplifier for strongly reducing the degree of amplification for the laser radiation after a brief time as the result of transient absorption. Systems in which a proton transfer takes place in the excited state serve as switching dyes. The radiation pulse which excites the switching dye must have a sufficiently steep leading flank, so that the excited state of the tautomeric form is rapidly occupied. The immediately following occupation of one or more metastable states produces the building up of transient absorption and inhibits the building up of an inversion sufficient for renewed radiation emission.

Although the invention has been described with reference to particular illustrative examples, it will be recognized modifications and variations are possible within the inventive concept.

I claim:

1. Operating process for a dye-laser, comprising the steps of exciting, by a pumping radiation pulse, a normal form of a chemical molecule system, capable of a proton-transfer reaction, from a ground state ($^1N$) of said normal form to an excited state ($^1N^*$) thereof which then spontaneously converts itself with a very short first time constant by proton transfer reaction into a laser-capable excited state ($^1T^*$) of a tautomeric form of said system which tends to decay by a mix of a radiatively stimulated transition into its ground state ($^1T$) and a radiationless transition into its ground state ($^1T$) and a radiationless transition into its lowest triplet state ($^3T$), said mix depending on the temperature, said radiationless transitions together having a second time constant, said ground state ($^1T$) of said tautomeric form having a higher energy level than said ground state ($^1N$) of said normal form, said triplet sate ($^3T$) of said tautomeric form being in equilibrium with the lowest triplet state ($^3$N) of the normal form, said triplet states ($^3$T and $^3$N) of the tautomeric or of the normal form absorbing light at wavelengths corresponding to that emitted by the dye-laser and reverting to their respective ground state ($^1$T and $^1$N) with a relatively large third time constant, and/or said ground staate of the said tautomeric form ($^1$T) absorbing light at wavelengths corresponding to that emitted by the dye-laser and reverting to the ground state ($^1$N) of the normal form with a relatively large third time constant, and further comprising:

performance of the pumping step by producing a rise of pumping radiation intensity to a value sufficient for the emission of a short laser pulse, said rise of intensity to said value being produced in an interval which is shorter than twice said second time constant and, then, during the remainder of said pumping radiation pulse maintaining said pumping radiation at an intensity which does not rise further, if at all, at a rate of more than 10% per interval defined by said second time constant.

2. Process according to claim 1, wherein said value to which said pumping radiation pulse intensity rises during said rise interval which is shorter than twice said second time constant is a first maximum of said intensity and is not exceeded, if at all, by more than 50% during the remainder of said pumping radiation pulse.

3. Process according to claim 1, wherein said chemical molecule system capable of a proton-transfer reaction is utilized both as a laser dye and as a switching dye for time limiting laser emission.

4. Process according to claim 1, wherein said chemical molecule system is used for time limiting of laser emission as a supplement to a laser dye emitting laser radiation limited in time by said chemical molecule system.

5. Process according to claim 1, wherein said chemical molecule system is constituted by one compound of the group consisting of:
2-(2-hydroxyphenyl)-oxazole;
2-(2-hydroxyphenyl)-5-phenyl-oxazole;
2-(2-hydroxynaphth-1-yl)-5-phenyl-oxazole;
2-(3-hydroxybiphen-4-yl)-5-(4-biphenyl)-oxazole;
2,5-bis-(5-phenyloxazol-2-yl)-hydrochinone;
2-(2-hydroxyphenyl)-benzoxazole;
2-(3-hydroxybiphen-4-yl)-5-phenyl-benzoxazole;
2,5-bis-(benzoxazol-2-yl)-phenol;
2,5-bis-(benzoxazol-2-yl)-hydrochinone;
6-(benzoxazol-2-yl)-7-hydroxy-coumarin, and
2-phenyl-5-(3-hydroxybiphen-4-yl)-1,3,4-oxadiazole.

6. Process according to claim 1, in which said chemical molecule system is constituted by a solution of a compound selected from the group consisting of 7-hydroxyflavone and 7-hydroxychinoline in a protonic solvent.

7. Process according to claim 6, in which said protonic solvent is a lower alkyl alcohol.

8. Process according to claim 7, in which said alcohol is methanol.

9. Process according to claim 8, in which said alcohol is ethanol.

10. Apparatus for producing short laser pulses comprising an optical resonator, a cuvette positioned in said optical resonator and containing a chemical molecule system capable of a proton transfer reaction and also capable of serving as an active laser medium, pumping radiation source means for producing pumping radiation pulses reaching said resonator and for producing there a population inversion in said laser medium, said optical resonator having a decay time suitable for the emission of a laser radiation pulse with a duration of less than 200 picoseconds and said pumping radiation source being so constituted that pumping radiation pulses delivered therefrom have a rise time which is shorter than twice the time constant of decay of an excited state (T*) of a tautomeric form of said chemical molecule system and the amplitude of said pumping radiation pulse after said rise time and after emission of a short stimulated radiation pulse is maintained at an intensity which remains below a relative rise rate of 10% per interval defined by said time constant.

11. Apparatus for producing short laser pulses comprising an optical resonator, a cuvette positioned in said resonator containing an active laser medium, means for producing pumping radiation pulses for exciting a population inversion in said laser medium and a chemical molecule system in said cuvette capable of a proton transfer reaction, in addition to said active laser medium therein, said optical resonator having a small decay time suitable for the emission of a laser radiation pulse having a duration of less than 200 picoseconds, said chemical molecule system in said cuvette being such that said pumping radiation pulses convert a ground state ($^1$N) of a normal form of said chemical system into an excited state ($^1$N*) of said normal form, which then spontaneously converts itself by proton transfer reaction with a first time constant into an excited state ($^1$T*) of a tautomeric form of said chemical system, which tautomeric form tends to decay into metastable states which have a transient absorption for the laser radiation emitted by said active laser medium.

12. Apparatus according to claim 11, wherein said cuvette (50) has two chambers, in one of which said active laser medium is contained and in the other of which said chemical system capable of proton transfer reaction is contained.

13. Apparatus for amplifying and shortening laser radiation pulses comprising a cuvette (64) in the radiation path of laser radiation pulses to be amplified and shortened, said cuvette containing an active laser medium suitable for amplifying said laser radiation pulses, said apparatus including means for providing pumping radiation pulses for producing a population inversion in said active laser medium, a chemical molecule system capable of a proton transfer reaction being provided also in said radiation path of said laser radiation pulses to be amplified and shortened, means (66, 70) being provided for exposing said chemical system to a part of said pumping radiation pulses, said chemical system being so selected that each of said pumping radiation pulses it is excited from a ground state ($^1$N) of a normal form thereof into an excited state ($^1$N*) of said normal form, which then converts itself spontaneously by proton transfer with a very short first time constant into an excited state ($^1$T*) of a tautomeric form of said chemical molecule system, which tautomeric form then makes a transition into metastable states which have a transient absorption for the laser radiation to be amplified and shortened.

14. Apparatus according to claim 10, in which said chemical system is selected so that said time constant of said tautomeric form does not exceed 200 picoseconds.

15. Apparatus according to claim 11, wherein said chemical system is so selected that said excited state of said tautomeric form of said system decays with a second time constant which does not exceed 200 picoseconds.

16. Apparatus according to claim 10, wherein said means for producing pumping radiation pulses is constituted to produce pulses having a said rise time that is less than 400 picoseconds.

* * * * *